(12) United States Patent
Leermann et al.

(10) Patent No.: US 10,844,246 B2
(45) Date of Patent: Nov. 24, 2020

(54) MANUALLY TEARABLE TEXTILE ADHESIVE TAPE AND APPARATUS FOR MAKING SAME

(71) Applicant: certoplast Technische Klebebaender GmbH, Wuppertal (DE)

(72) Inventors: Timo Leermann, Wuppertal (DE); Peter Rambusch, Wuppertal (DE); Rene Rambusch, Wuppertal (DE)

(73) Assignee: certoplast Technische Klebebaender GmbH, Wuppertal (DE)

( * ) Notice: Subject to any disclaimer, the term of this patent is extended or adjusted under 35 U.S.C. 154(b) by 181 days.

(21) Appl. No.: 15/740,684

(22) PCT Filed: Jul. 13, 2016

(86) PCT No.: PCT/EP2016/066678
§ 371 (c)(1),
(2) Date: Jan. 14, 2018

(87) PCT Pub. No.: WO2017/012957
PCT Pub. Date: Jan. 26, 2017

(65) Prior Publication Data
US 2018/0187050 A1    Jul. 5, 2018

(30) Foreign Application Priority Data
Jul. 20, 2015  (DE) .................... 20 2015 103 809 U

(51) Int. Cl.
*C09J 7/21* (2018.01)
*D03D 15/00* (2006.01)
*D03D 1/00* (2006.01)
*D03D 13/00* (2006.01)
*D02G 3/02* (2006.01)
*D02G 3/44* (2006.01)
*D06M 11/38* (2006.01)
*D06M 101/32* (2006.01)

(52) U.S. Cl.
CPC .................. *C09J 7/21* (2018.01); *D02G 3/02* (2013.01); *D02G 3/44* (2013.01); *D03D 1/00* (2013.01); *D03D 13/008* (2013.01); *D03D 15/00* (2013.01); *D06M 11/38* (2013.01); *C09J 2203/302* (2013.01); *C09J 2301/312* (2020.08); *C09J 2400/263* (2013.01); *C09J 2467/006* (2013.01); *D06M 2101/32* (2013.01); *D10B 2331/04* (2013.01); *D10B 2401/06* (2013.01)

(58) Field of Classification Search
USPC .............................................. 28/100; 442/64
See application file for complete search history.

(56) References Cited

U.S. PATENT DOCUMENTS

| 4,121,626 A | 10/1978 | Brown et al. |
| 9,034,424 B2 * | 5/2015 | Baek .......................... C09J 7/21 427/207.1 |
| 9,611,408 B2 | 4/2017 | Lodde et al. |
| 2005/0015178 A1 | 1/2005 | Shaw |

FOREIGN PATENT DOCUMENTS

| DE | 202007006816 U | 10/2008 |
| DE | 102008039735 A | 3/2010 |
| DE | 102005044942 B | 12/2011 |
| DE | 202013102969 U | 11/2014 |
| EP | 2050802 B | 5/2010 |
| GB | 653529 B | 1/1948 |
| WO | 2013102649 A | 7/2013 |

* cited by examiner

*Primary Examiner* — Lynda Salvatore
(74) *Attorney, Agent, or Firm* — Andrew Wilford

(57) ABSTRACT

The invention relates to a device for producing a manually tearable textile adhesive tape. The device has a supply unit for longitudinal and/or transverse threads and a treatment device. In the treatment device, the threads supplied by the supply unit are treated with a processing liquid that attacks the fibers of the particular thread until the tear strength of the thread is reduced by approximately 5% to 60%. The device also has a weaving unit, in which the treated threads and/or untreated threads are woven with each other in order to form a carrier tape. A final coating unit serves to coat the carrier tape with a glue at least on one side.

8 Claims, No Drawings

MANUALLY TEARABLE TEXTILE ADHESIVE TAPE AND APPARATUS FOR MAKING SAME

CROSS REFERENCE TO RELATED APPLICATIONS

This application is the US-national stage of PCT application PCT/EP2016/066678 filed 13 Jul. 2016 and claiming the priority of German patent application 202015103809.7 itself filed 20 Jul. 2015.

FIELD OF THE INVENTION

The invention relates to an apparatus for making a manually tearable textile adhesive tape, and to an associated adhesive tape.

BACKGROUND OF THE INVENTION

Manually tearable textile adhesive tapes are manufactured and produced in myriad ways. Their area of application frequently lies in the automotive industry where they are used for wrapping cable bundles in automobiles. The manual tearability ensures that an assembly worker can pull a length of this adhesive tape from a roll without additional aids such as scissors or a knife and tear it to the desired length without any difficulty by hand. This is usually done transverse to the longitudinal extension. The assembly worker then wraps the section of adhesive tape produced in this way around the cable to be secured.

Various approaches are known from the prior art for enabling the manual tearability to be adjusted. For instance, EP 2 050 802 teaches a mixed fabric that has polyester fibers or polyester yarns as warp yarns and of cotton yarns as weft yarns. This is intended to enable the known adhesive tape to be torn with particular ease in the transverse direction.

In DE 10 2005 044 942, the approach taken is such that the textile support tape is treated with lye or, when polyamide is used, treated with acid in order to produce the manually tearable adhesive tape. In this way, the desired reduced fiber tear strength of the support material is usable. However, the entire support tape or the entire fabric is treated with the lye or acid in question, so that while the desired reduced strength is observed, this is achieved at the expense of an inevitable reduction in abrasion resistance.

WO 2013/0102649 A1 describes a further development of the teaching of DE 10 2005 044 942 B4. Specifically, the textile woven support tape is treated with acid or lye until its tear strength is less than 100 N/cm. The known teaching assumes here that, in fabric substrate tapes, a tear strength of less than 100 N/cm—particularly in the longitudinal direction, i.e. in the direction of the warp yarns of the fabric substrate tape, can be deemed to be manually tearable.

In fact, the prior art according to DE 20 2007 006 816 for example provides commensurate criteria that the fabric substrate in question can be characterized as being manually tearable overall in such a configuration. As in DE 10 200 044 942, however, treatment of the entire fabric substrate is performed in WO 2013/102649 as well, so that, once again, the reduction in tear strength is accompanied by a reduction in abrasion resistance.

Adhesive tapes, however, which are generally used as wrapping tapes for encasing elongate objects and, particularly, of cable harnesses in automobiles, do not only need to be manually tearable, but must also withstand the prevailing environmental conditions. These often involve elevated temperatures in the engine compartment of up to 100° C. and above, as well as gasoline, oil, coolant, etc. that must not compromise the adhesive tape in question or impair its functionality. Moreover, ever increasing requirements are being placed on the abrasion resistance of such adhesive tapes.

This can be attributed to the fact that cable harnesses have substantial length and weight in modern automobiles and are installed at practically any and all angles. This inevitably leads to possibly abrasive contact with body components, engine parts, etc. In order for the adhesive tape to retain its functionality overall and not be worn through in case of this possibly abrasive contact, the requirements placed on their abrasion resistance are becoming ever more stringent.

In the prior art, abrasion resistance or strength is usually determined and defined on the basis of sets of standards used in the automotive industry, such as delivery standard LV312, "Adhesive Tapes for Cable Sets in Motor Vehicles" (January 2005). Reference is made in this regard to DE 20 2007 006 816, with further references.

It is true that the prior art is capable of providing the required manual tearability, particularly in a fabric substrate tape made on the basis of polyester yarns. This is achieved through treatment with the treatment liquid described above, specifically with lye or acid. However, this also inevitably leads to reduced abrasion resistance in the support tape in question, because the individual yarns have been specifically damaged with respect to their fiber tear strength. For the reasons set out above, however, a reduction in abrasion resistance is disadvantageous. This is where the invention comes in.

OBJECT OF THE INVENTION

The object of invention is to provide an apparatus for making a manually tearable textile adhesive tape and an adhesive tape that satisfies the demands inherent to its use particularly as wrapping tape for encasing cables in automobiles while having the required manual tearability and having a more abrasion-resistant design compared to previous designs.

SUMMARY AND SPECIFIC DESCRIPTION OF THE INVENTION

In fact, the approach taken by the invention is, for starters, not to treat of the entire support tape or fabric substrate tape with a treatment liquid, as is done by DE 10 2005 044 942 and the further development according to WO 2013/102649. Instead, in the context of the invention, only individual yarns are treated with the treatment liquid in question in a treatment device. The yarns are then fed from a supply of longitudinal or transverse yarns to the treatment device in question. In the treatment device, the yarns fed in from the supply are treated with a treatment liquid that attacks the fibers of the respective yarn until their tear strength has been reduced by about 5% to 60% in comparison to the yarn prior to such treatment.

The previously cited relative reduction in tear strength follows from a comparison of the tear strength of the untreated yarn before passing through the treatment device in comparison to the tear strength of the yarn after passing through the treatment device. The tear strength is determined according to DIN EN 14 410. Reference is additionally made to DE 20 2013 102 969, that enumerates and summarizes the relevant standards for characterizing adhesive tapes in this context. In any case, the treated yarns are characterized by a tear strength that is reduced by about 5% to 60% in comparison to the untreated yarns.

In the case of polyester yarns, the treatment liquid is lye, particularly a solution of caustic soda. On the other hand, if polyamide yarns are used, then an acid is typically used as the treatment liquid. Formic acid has been found to be a suitable acid for polyamide yarns.

The invention generally makes use of polyester yarns as longitudinal and transverse yarns, because polyester fabrics made from polyester yarns are especially suitable for the described application. In fact, polyester fabrics are characterized by a high level of abrasion resistance, a tear-resistant design, and substantial temperature stability, so that such polyester fabrics are particularly suited for use as wrapping tape for wrapping cables in automobiles.

However, polyester fabric generally cannot be torn by hand. According to the invention, in order to ensure the required manual tearability nonetheless, individual longitudinal or transverse yarns of the fabric made thereof and thus of the fabric substrate tape are treated with the treatment liquid until the tear strength has been reduced as described. In principle, the individual longitudinal or transverse yarns can be both longitudinal yarns and transverse yarns.

At base, the invention is or can be used or applied even if a polyester fabric constructed from untreated longitudinal and transverse yarns can already be torn by hand. In this case, the additional treatment of individual yarns and the fabric that is then produced therefrom ensure that the manual tearability involves reduced forces corresponding, for example, to a tear strength of the textile woven support tape of substantially less than 100 N/cm and lies, for example, at 50 N/cm or 60 N/cm. In any event, it is possible in the context of the invention to adapt the woven support tape to actual requirements, particularly with respect to manual tearability. For this purpose, individual yarns are treated and woven with untreated yarns to form the support tape in question.

The approach taken by the invention is generally such that all the longitudinal yarns of the fabric to be produced subsequently are subjected to the treatment in question with the treatment liquid. In contrast, the transverse yarns are all untreated or are present as untreated yarns, so they do not have a tear strength that is reduced in comparison to the longitudinal yarns. This makes it possible, on the one hand, to tear the fabric produced in this way, and particularly the support tape, with particular ease, because the longitudinal yarns that are primarily responsible for the tear strength in the transverse direction have been appropriately weakened with respect to their tear strength.

On the other hand, the transverse yarns have not experienced any weakening. Consequently, the fabric produced in this way—and thus the fabric substrate or fabric substrate tape produced therefrom as well—has a practically equivalent or, at most, slightly reduced abrasion resistance in comparison to a polyester fabric of comparable construction in which both the longitudinal and transverse yarns are untreated. For the first time, the invention thus combines the special advantages of a fabric substrate tape made of polyester yarns with manual tearability and abrasion resistance that are achieved in a simple manner. Herein lie the fundamental advantages.

Myriad possibilities exist in the framework of the invention for additional configurations. For instance, all of the longitudinal yarns can pass through the treatment device and be treated with the treatment liquid until the desired reduced tear strength of about 5% to 60% is observed. It is also possible, however, for not all of the longitudinal yarns, but rather only every other or every third longitudinal yarn to undergo the described treatment. In such a case as well, the desired manual tearability is (still) achieved in the transverse direction. Moreover, the transverse yarns can of course also pass through the treatment device and be treated with the treatment liquid until their tear strength has the claimed reduction of about 5% to 60%. In general, however, the transverse yarns will remain untreated in order, with their aid, to impart maximum wear resistance to the overall woven support tape. Comparable wear resistance levels are indeed observed in the manually tearable textile adhesive tape produced according to the invention as are observed in an adhesive tape with an identically constructed substrate made of untreated yarns.

In order to set the desired reduced tear strength of 5% to 60% of the treated yarns in comparison to the untreated yarns, the approach taken is generally that the yarn fed from the supply passes through the treatment liquid in a continuous or discontinuous process. Work is generally performed continuously. Then the yarns to be treated pass continuously at a predetermined speed through the treatment device, and usually one time. Of course, it is generally also possible to pass the yarns to be treated multiple times through the treatment device and thus to treat them multiple times with the treatment liquid. Overall speeds of 20 m/min and particularly 30 m/min have proven to be especially favorable. Moreover, the treatment time is generally set to at least 4 minutes.

Furthermore, the yarns to be treated are passed through the treatment device with the treatment liquid located therein with a liquor ratio of about 1:20 and more. The liquor ratio expresses the relationship of the quantity of textile yarns to the quantity of treatment liquid in the treatment device. After treatment, the individual yarns can pass through a steamer with saturated steam. The saturated steam is typically set up in a treatment room to which saturated water vapor is applied. The invention as a whole proceeds in such a way that, if caustic soda solution is used as the treatment liquid, the concentration typically lies in the range from 10 g/liter to 40 g/liter in the treatment device.

In this way, it is possible to reduce the tear strength of the untreated yarn after passing through the treatment liquid on the interior of the treatment device by at least 5% in consideration of the throughput velocity and treatment time indicated above. In general, a reduction in the tear strength of even up to 60% is achieved.

Thus, when untreated (polyester) yarns are fed from the supply into the upstream intake end of the treatment device and treated in the treatment device with the caustic soda solution located therein in the indicated concentration and in consideration of the above-described treatment time, it can be expected that the polyester yarns in question will have a reduced tear strength after passing through the treatment device, particularly a tear strength that is reduced by 5% to 60%.

The yarns, particularly longitudinal yarns, treated in this way are then fed to the treatment device of a loom. In the loom, the treated yarns are generally woven together with untreated yarns to form a fabric. The support tape is produced from the fabric, for example by cutting the fabric into individual support tapes already at this juncture, or they are first coated with adhesive and then cut. A coater located downstream from the loom coats the woven tape with the adhesive. With the aid of the coater, the support tape is coated with the adhesive in question on at least one face.

During manufacture of the fabric in the loom, the procedure is generally such that yarns that have been treated with the aid of the treatment liquid are used as longitudinal yarns or warp yarns, whereas the transverse or weft yarns are present as untreated yarns and woven. In principle, it is also possible for only every other or every third longitudinal yarn to be a treated yarn, while the longitudinal yarns located therebetween and the transverse yarns are untreated. In order to achieve and set the desired tear strength, however, it is usually the case that all of the longitudinal yarns or warp yarns are yarns having reduced tear strength that have been treated with the treatment liquid, whereas the transverse yarns or weft yarns are untreated yarns having greater tear strength than the treated yarns. As a result, the desired manual tearability is observed in combination with an increased abrasion resistance compared to the prior art.

As explained previously, the treatment device is advantageously an alkalizer. The alkalizer is typically filled with a caustic soda solution in a predetermined concentration, for example with a concentration of 10 g/liter to 40 g/liter. Moreover, the caustic soda solution typically has a temperature of at least 50° C. and above.

After passing through the treatment device, the yarns in question can pass through a washer. Inside the washer, the yarns are washed and neutralized—for example, rinsed with water that is applied to the yarns by a sprayer. In this way, overall pH-neutral conditions are set, thus eliminating the possibility of lye still adhering to the yarns during the subsequent weaving process in the loom.

Before the yarns to be treated pass through the treatment device, they can also undergo cleaning. A cleaning station can be arranged upstream from the treatment device for this purpose. In this cleaning station, the yarns are freed of any contaminants such as oil or fat as needed. That is not mandatory, however, especially since cleaning is generally also performed automatically, as it were, in the subsequent treatment device.

For the adhesive tape produced in this manner, the invention recommends the use of yarns and particularly of polyester yarns, with the fabric in question—and thus the woven support tape as well—being preferably outfitted with a yarn density of greater than 20 yarns/cm. This means that the support tape has more than 20 warp yarns/cm and more than 20 weft yarns/cm. Moreover, it has proven advantageous if the fineness with respect to the length of the yarns, i.e. of the warp and weft yarns, is greater than 1500 dtex/cm. This produces the basic conditions that enable the adhesive tape produced in this way with the woven support in question to have the requisite strength for the described application. At the same time, the targeted weakening of individual yarns in the woven support tape undertaken according to the invention ensures that the desired manual tearability is observed particularly in the transverse direction.

The yarns whose strength has been weakened are typically all of the longitudinal yarns, whereas the transverse yarns of the woven support tape are not weakened at all. As a result, the adhesive tape produced in this way has a level of abrasion resistance that is comparable to an adhesive tape with yarns of identical composition but that are untreated. In fact, it is primarily the untreated transverse yarns that provide the desired abrasion characteristics in the adhesive tape according to the invention. Herein lie the fundamental advantages.

The described device can be constructed such that the yarns pass from the supply through the treatment device and then the loom, followed by the coater. This can be set up in a production line, as it were. However, it is also possible for the individual processing steps to be carried out in a practically discontinuous manner. In that case, after passing through the treatment device, the yarns are first wound up and then fed from there to a separate weaving process. The subsequent coating can also be performed in a separate manufacturing step.

The invention claimed is:

1. An apparatus for making a manually tearable textile adhesive tape, the apparatus comprising:
   a supply of longitudinal yarns and transverse yarns;
   a treatment device in which all or selected longitudinal yarns from the supply are treated with a treatment liquid that has a liquor ratio of about 1:20 and that weakens the fibers of the treated longitudinal yarns until their tear strength has been reduced by 5% to 60% while all of the transverse yarns are not treated;
   a loom downstream in the direction from the treatment device and in which the treated longitudinal yarns and the untreated transverse yarns are woven together into a support tape; and
   a final coater downstream of the loom for coating the support tape with an adhesive on at least one face.

2. The apparatus defined in claim 1, wherein individual, selected longitudinal yarns are treated in the treatment device.

3. The apparatus defined in claim 1, wherein the treatment device is an alkalizer.

4. The apparatus defined in claim 3, wherein the alkalizer is filled with a caustic soda solution in a predetermined concentration.

5. The apparatus defined in claim 1, further comprising:
   a cleaning station upstream from the treatment device.

6. The apparatus defined in claim 1, further comprising:
   a washer for washing and neutralizing the treated yarns downstream from the treatment device.

7. The apparatus defined in claim 1, wherein all or selected longitudinal yarns of the support tape are treated and have the reduced tear strength, whereas the transverse yarns are untreated with a tear strength that has not changed in comparison to a tear strength of the treated longitudinal yarns.

8. A textile adhesive tape made by the apparatus of claim 1.

* * * * *